(12) United States Patent
Yamakawa

(10) Patent No.: US 6,366,364 B1
(45) Date of Patent: Apr. 2, 2002

(54) IMAGE READOUT APPARATUS

(75) Inventor: Hiromitsu Yamakawa, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/187,075

(22) Filed: Nov. 6, 1998

(30) Foreign Application Priority Data

Nov. 11, 1997 (JP) .............................................. 9-325404

(51) Int. Cl.⁷ ................................................. H04N 1/04
(52) U.S. Cl. ........................ 358/474; 358/512; 358/518
(58) Field of Search ................................ 358/474, 509, 358/506, 487, 513, 486, 454

(56) References Cited

U.S. PATENT DOCUMENTS 5,210,570 A * 5/1993 Minmlsawa et al. .......... 355/38
5,283,698 A * 2/1994 Fukuzawa et al. .......... 359/896
5,852,502 A * 12/1998 Patrick ....................... 358/512
5,880,859 A * 3/1999 Hiromatsu .................. 358/514

* cited by examiner

*Primary Examiner*—Jerome Grant, II
*Assistant Examiner*—Negussie Worku
(74) *Attorney, Agent, or Firm*—Snider & Associates; Ronald R. Snider

(57) ABSTRACT

Respective image information data of three colors for forming a color image and a monochrome image information data are obtained from output values of at least three imaging element lines and a computed value based on these output values, whereby the readout speed for monochrome images is made as fast as that in a dedicated apparatus for reading out monochrome images, while using only the imaging element lines used for reading out color images. Three CCD lines 4A, 4B, and 4C are constituted by a (B-reading) CCD line 4A for reading out blue wavelength region, a (monochrome-reading) CCD line 4B for reading out the whole visible wavelength region, and a (R-reading) CCD line 4C for reading out red wavelength region, which yield blue, monochrome, and red outputs, respectively. The arithmetic unit 5 yields a green output.

5 Claims, 3 Drawing Sheets

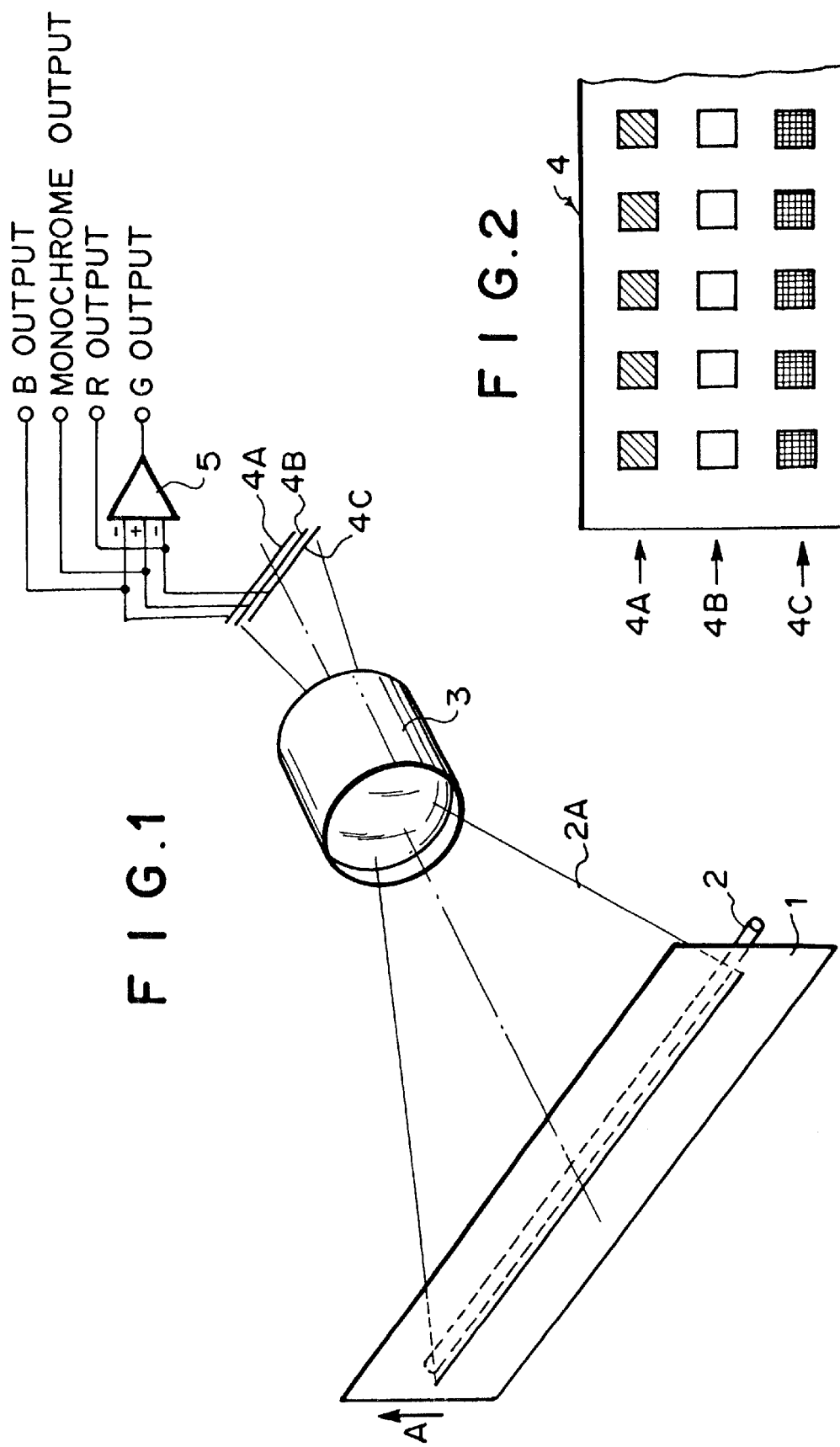

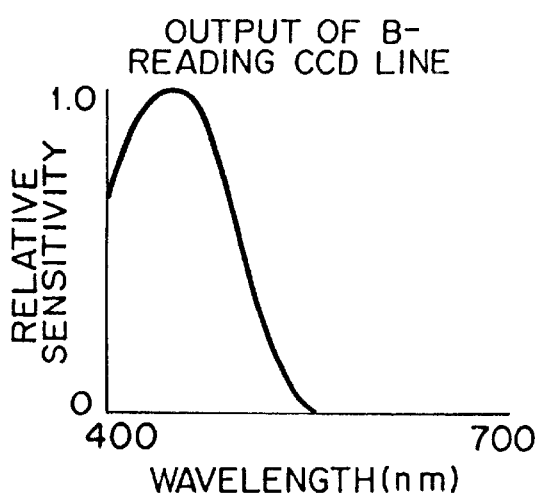
FIG.3A OUTPUT OF B-READING CCD LINE
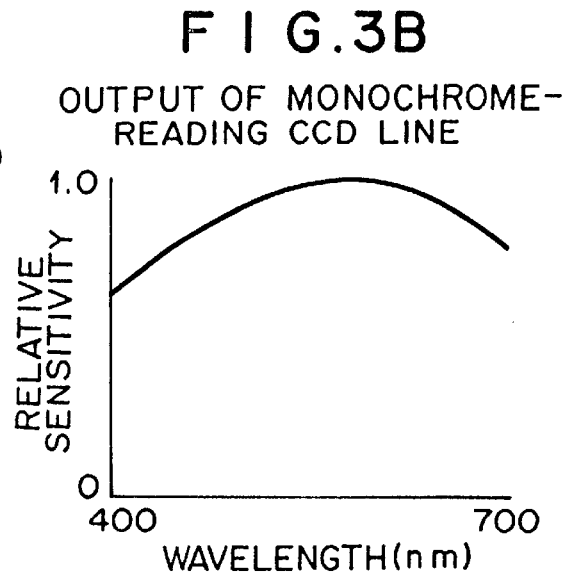
FIG.3B OUTPUT OF MONOCHROME-READING CCD LINE
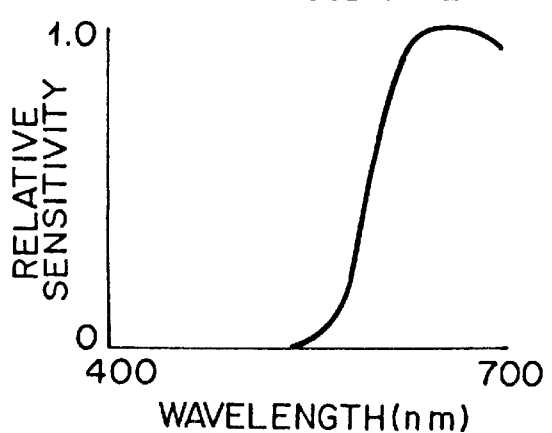
FIG.3C OUTPUT OF R-READING CCD LINE
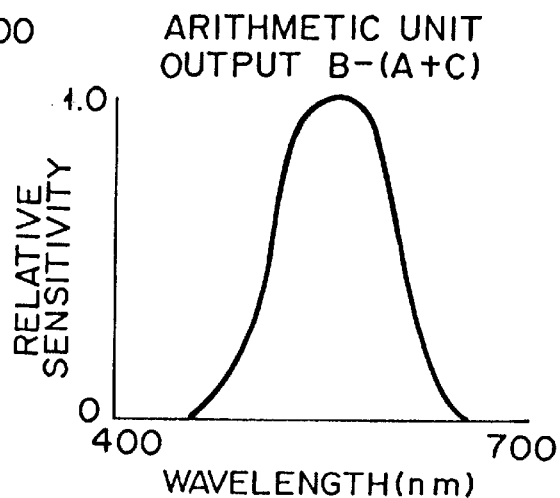
FIG.3D ARITHMETIC UNIT OUTPUT B−(A+C)

OUTPUT OF B-READING CCD LINE

OUTPUT OF MONOCHROME-READING CCD LINE

OUTPUT OF B/G-READING CCD LINE

ARITHMETIC UNIT OUTPUT 1 B−C

ARITHMETIC UNIT OUTPUT 2 C−A

IMAGE READOUT APPARATUS

RELATED APPLICATIONS

This application claims the priority of Japanese Patent Application No. 9-325404 filed on Nov. 11, 1997, which is incorporated herein by reference.

BACKGROUND OF THE INVENTION

1. Field of the Invention

The present invention relates to an image readout apparatus such as copier, facsimile machine, or image scanner; and, in particular, to an image readout apparatus which reads out color and monochrome images by means of several pieces of linear imaging elements.

2. Description of the Prior Art

There has conventionally been known an image readout apparatus which can read out both color and monochrome images by means of three CCD lines. Such an image readout apparatus reads out monochrome images by using one of the three CCD lines.

Since an imaging device for reading out colors separately captures three color light images by using three CCD lines, the surface of each element of CCD is coated with a filter having a wavelength characteristic for its corresponding color, which restricts the readable wavelength range, whereby the quantity of light reaching into each element would become smaller.

In a simple way of reading out monochrome images, one of the CCD lines for blue, green, and red has been used. In this case, however, the readable light wavelength range would become narrower than that in the case where a dedicated CCD line for reading out monochrome images is provided, thus greatly reducing the total readout light quantity. Hence, when reading out a monochrome image from a color original, the degree of contrast may vary depending on the color of the original.

Since making the readout speed higher when reading out monochrome images than when reading out color images would decrease the readout light quantity, it has been difficult to improve the readout speed without carrying out any particular modification of design such as an increase in the light quantity of light source.

SUMMARY OF THE INVENTION

It is an object of the present invention to provide an image readout apparatus which can read out both color and monochrome images by using a plurality of imaging element lines, wherein the readout speed for monochrome images can be made as fast as that in a dedicated apparatus for reading out monochrome images, while using only the imaging element lines used for reading out color images.

The image readout apparatus in accordance with the present invention comprises a light source for illuminating an original, an imaging lens for forming an image of the original illuminated by the light source, and at least three imaging element lines for reading out the image of the original formed by the imaging lens, wherein at least two of the imaging element lines have readout sensitivities for first and second visible light wavelength regions which are different from each other, at least one of the remaining imaging element lines has no specific wavelength selectivity in a visible light wavelength region, and respective image information data of three colors for forming a color image and a monochrome image information data are obtained according to output values from the at least three imaging element lines and a computed value based on the output values.

Also, the image readout apparatus may be configured such that three of the imaging element lines are formed as one set on an imaging device, two of which have sensitivities for two respective color light components, different from each other, selected from red, green, and blue, and the remaining imaging element line has no specific wavelength selectivity in the visible light wavelength region.

Further, in this case, the image readout apparatus may be configured such that, letting the respective outputs from the two imaging element lines be A and B, and the output from the remaining imaging element line be Z, the color light component not outputted from the two imaging element lines among red, green, and blue is obtained according to an arithmetic expression of $K_z Z - (K_a A + K_b B)$, where Kz Ka, and Kb are constants appropriately determined according to the output levels of the respective imaging element lines.

BRIEF DESCRIPTION OF THE DRAWINGS

FIG. 1 is a schematic view showing an image readout apparatus in accordance with an embodiment of the present invention;

FIG. 2 is a diagram for explaining the CCD lines of FIG. 1;

FIGS. 3A to 3D are graphs showing light wavelength characteristics of the respective outputs in the image readout apparatus of FIG. 1.

DESCRIPTION OF THE PREFERRED EMBODIMENTS

Figure 4A:
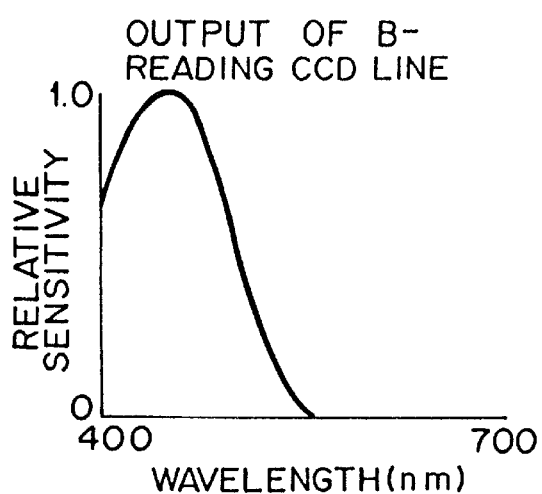
FIGS. 4A to 4E are graphs showing light wavelength characteristics of the respective outputs in the image readout apparatus in accordance with an embodiment different from that of FIG. 1.

In the following, embodiments of the present invention will be explained with reference to the accompanying drawings.

Though it is necessary to carry out operations for multiplying the respective outputs of the imaging element lines by constants which are appropriately determined in response to the output levels of the respective imaging element lines in practice, each constant will be assumed to be 1 for simplifying the explanation.

FIG. 1 shows an image readout apparatus in accordance with an embodiment of the present invention.

This image readout apparatus comprises a long white light source 2, disposed close to an original 1, extending in a direction orthogonal to a sub-scanning direction (direction of arrow A) for the original; an imaging lens 3 for forming, onto CCD lines 4A, 4B, and 4C of a CCD, an image of a reflected light component 2A from the original 1 in the light from the white light source 2; and an arithmetic unit 5 for subjecting the outputs from the respective CCD lines 4A, 4B, and 4C to predetermined operations; thereby being capable of reading out both color and monochrome images.

The white light source 2 is adapted to emit light having a wavelength characteristic which is substantially flat over the whole visible light region.

The three CCD lines 4A, 4B, and 4C are constituted by a (B-reading) CCD line 4A for reading out blue wavelength region, a (monochrome-reading) CCD line 4B for reading out the whole visible wavelength region, and a (R-reading)

CCD line 4C for reading out red wavelength region, which yield blue, monochrome, and red outputs, respectively. The arithmetic unit 5 yields a green output.

FIG. 2 shows the individual CCD lines 4A, 4B, and 4C, indicating that each of the CCD lines 4A, 4B, and 4C comprises a number of elements arranged in line. The surface of each element in the CCD line 4A for reading out blue wavelength region is coated with a blue filter, whereas the surface of each element in the CCD line 4C for reading out red wavelength region is coated with a red filter, whereby, of the white light irradiating the individual elements, only the light components in the blue and red wavelength regions are allowed to enter into their corresponding elements. The surface of each element in the CCD line 4B for reading out the whole visible wavelength region is not coated with a colored filter, whereby the white light irradiating each element enters therein as it is.

In this embodiment, the outputs from the individual CCD lines 4A, 4B, and 4C have wavelength characteristics shown in FIGS. 3A, 3B, and 3C, respectively.

When outputs having such wavelength characteristics are fed into the arithmetic unit 5 and, letting the outputs of the B-reading CCD line, monochrome-reading CCD line, and R-reading CCD line be A, B, and C, respectively, an operation of B−(A+C) is carried out, the arithmetic unit 5 outputs a signal for green having a wavelength characteristic shown in FIG. 3D.

Namely, since the wavelength characteristic of the output of the monochrome-reading CCD line is equivalent to the sum of wavelength characteristics for blue, green, and red which are three primary colors of light as shown in FIG. 3B, the green output shown in FIG. 3D would be obtained when the B-reading CCD line output (A) and the R-reading CCD line output (C) are subtracted from the monochrome-reading CCD line output.

In each graph of FIGS. 3A to 3D, the ordinate indicates relative sensitivity, whereas the abscissa indicates the wavelength within the range of 400 to 700 nm substantially corresponding to the visible light wavelength region.

Thus, in this embodiment, while the number of CCD lines is kept at 3 which is the minimum number necessary for reading out color images, one CCD line 4A is exclusively used for reading out monochrome images, so as to improve the readout speed for the monochrome images, and the color light signal not directly outputted from the CCD lines 4B and 4C is obtained by a simple operation carried out by the arithmetic unit 5.

As a consequence, while the arrangement of CCD and the like are kept substantially the same as conventional ones, the readout speed for monochrome images can be improved.

Though the three CCD lines in the above-mentioned embodiment are constituted by blue-reading and red-reading CCD lines in addition to the monochrome-reading CCD line, any combination may be employed as long as the outputs for the three color light components and the monochrome output can be obtained by means of the three CCD lines and arithmetic unit. Namely, in place of those used in the above-mentioned embodiment, blue-reading and green-reading CCD lines or green-reading and red-reading CCD lines may also be used in addition to the monochrome-reading CCD line.

Alternatively, a single CCD line may read out wavelength regions of two color light components. For example, the image readout apparatus may be configured such that, of the three CCD lines 4A, 4B, and 4C, one is used as the monochrome-reading CCD line, another is used as the blue-reading CCD line, and the remainder is used as a blue/green-reading CCD line, while, letting the respective outputs from the individual CCD lines be A, B, and C, the arithmetic unit 5 computes B−C and C−A, so as to yield a signal for red and a signal for blue.

Figure 4B:
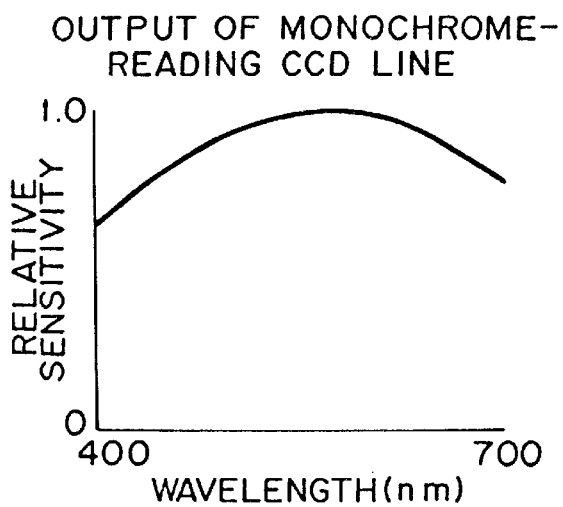
Figure 4C:
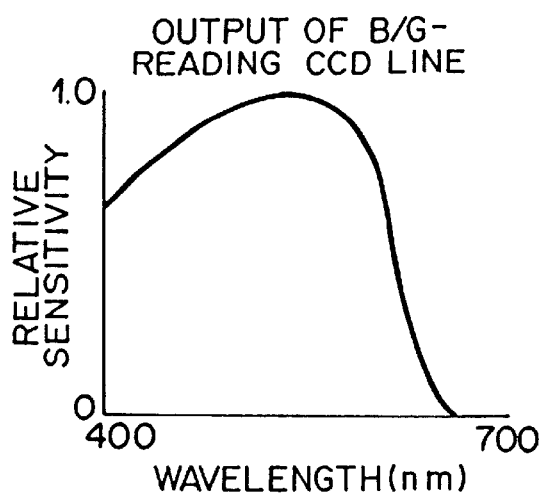
Figure 4D:
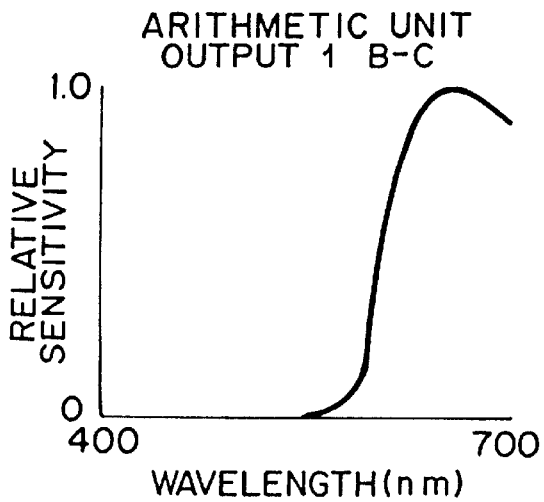
Figure 4E:
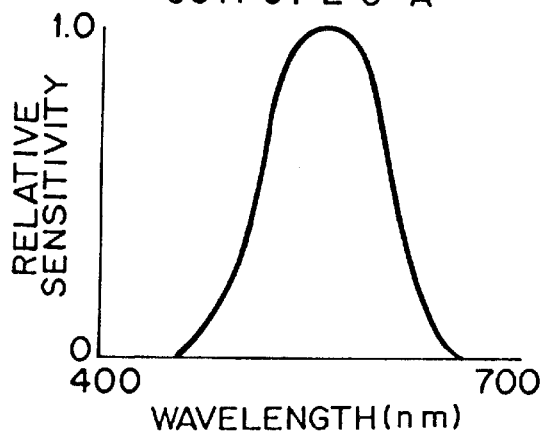

FIGS. 4A to 4E are graphs showing the light wavelength characteristic of the blue-reading CCD line (A), the light wavelength characteristic of the monochrome-reading CCD line (B), the light wavelength characteristic of the blue/green-reading CCD line (C), the light wavelength characteristic of the red signal obtained by an arithmetic unit output 1 (D), and the light wavelength characteristic of the green signal obtained by an arithmetic unit output 2 (E). In each graph, the ordinate and abscissa are defined similarly to those in the graphs shown in FIGS. 3A to 3D.

Each of two CCD lines may read out wavelength regions of two color light components. For example, the image readout apparatus may be configured such that, of the three CCD lines 4A, 4B, and 4C, one is used as the monochrome-reading CCD line, another is used as the blue/green-reading CCD line over two color light wavelength regions for blue and green, and the remainder is used as a green/red-reading CCD line over two color light components for green and red, while, letting the respective outputs from the individual CCD lines be A, B, and C, the arithmetic unit 5 computes A−B, A−C, and B+C−A, so as to yield a signal for red, a signal for blue, and a signal for green.

The arithmetic unit 5 may be either a dedicated operator for carrying out a predetermined operation or a CPU for executing an arithmetic operation according to a predetermined program.

As the imaging lens, the one used in a typical scanner, color scanner, or the like may be employed.

Though three imaging element lines are used in the above-mentioned embodiments, four or more imaging element lines may be used as well.

As explained in the foregoing, in the image readout apparatus in accordance with the present invention, of at least three imaging element lines, one is used as a monochrome imaging element line substantially covering the whole visible region, and the respective signals of three color light components for yielding a color image are obtained according to the output values of the at least three imaging element lines and the output value of the arithmetic unit for operating their output values. As a consequence, the imaging element lines needed for yielding a color image are used as they are, thus allowing both color and monochrome images to be read out. Further, the readout speed for monochrome images can be improved so as to be on a par with that in the dedicated apparatus for reading out monochrome images. Hence, the readout speed for monochrome images can be improved though employing a simple configuration.

What is claimed is:

1. An image readout apparatus comprising a light source for illuminating an original, an imaging lens for forming an image of said original illuminated by said light source, and at least three imaging element lines for reading out the image of said original formed by said imaging lens, wherein at least two of said imaging element lines have readout sensitivities for first and second visible light wavelength regions which are different from each other, at least one of said remaining imaging element lines has no specific wavelength selectivity in a visible light wavelength region, and respective image information data of three colors for forming a color image and a monochrome image information data are obtained according to output values from said at least three imaging element lines and a computed color value of a line based on said output values.

2. An image readout apparatus according to claim 1, wherein three of said imaging element lines are formed as one set on an imaging device, two of which have sensitivities for two respective color light components, different from each other, selected from red, green, and blue, and the remaining imaging element line has no specific wavelength selectivity in the visible light wavelength region.

3. An image readout apparatus according to claim 1, wherein, letting the respective outputs from said two imaging element lines be A and B, the output from the remaining imaging element line be Z, and $K_Z$, $K_a$, and $K_b$ be constants, the color light component not outputted from said two imaging element lines among red, green, and blue is obtained according to an arithmetic expression of $K_Z Z - (K_a A + K_b B)$.

4. An image readout apparatus comprising a light source for illuminating an original, an imaging lens for forming an image of said original illuminated by said light source, and at least three imaging element lines for reading out the image of said original formed by said imaging lens, wherein at least two of said imaging element lines have readout sensitivities for first and second visible light wavelength regions which are different from each other, at least one of said remaining imaging element lines has no specific wavelength selectivity in a visible light wavelength region, and respective image information data of three colors for forming a color image and a monochrome image information data are obtained according to output values from said at least three imaging element lines and a computed value based on said output values, and wherein three of said imaging element lines are formed as one set on an imaging device, two of which have sensitivities for two respective color light components, different from each other, and the remaining imaging element line has no specific wavelength selectivity in the visible light wavelength region.

5. An image readout apparatus according to claim 4, wherein, letting the respective outputs from said two imaging element lines be A and B, the output from the remaining imaging element line be Z, and $K_Z$, $K_a$, and $K_b$ be constants, the color light component not outputted from said two imaging element lines among red, green, and blue is obtained according to an arithmetic expression of $K_Z Z - (K_a A + K_b B)$.

* * * * *